(12) United States Patent
Sharma (10) Patent No.: US 8,639,668 B2
(45) Date of Patent: Jan. 28, 2014

(54) STRUCTURED REQUIREMENTS MANAGEMENT

(75) Inventor: Maneesh Kumar Sharma, Jaipur (IN)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 13/176,366

(22) Filed: Jul. 5, 2011

(65) Prior Publication Data

US 2013/0013613 A1   Jan. 10, 2013

(51) Int. Cl.
*G06F 17/00* (2006.01)
*G06F 17/30* (2006.01)

(52) U.S. Cl.
USPC ............................. 707/692; 707/731; 707/749

(58) Field of Classification Search
USPC ........................... 707/739, 749, 692, 731, 947
See application file for complete search history.

(56) References Cited

U.S. PATENT DOCUMENTS

| | | | |
|---|---|---|---|
| 6,295,541 B1 * | 9/2001 | Bodnar et al. | 1/1 |
| 7,765,502 B1 | 7/2010 | Spitzer et al. | |
| 7,899,756 B2 | 3/2011 | Rizzolo et al. | |
| 7,908,583 B2 | 3/2011 | Sengupta et al. | |
| 2003/0126156 A1 * | 7/2003 | Stoltenberg et al. | 707/104.1 |
| 2006/0230034 A1 | 10/2006 | Balmelli et al. | |
| 2007/0118522 A1 * | 5/2007 | Sperle et al. | 707/6 |
| 2008/0263504 A1 | 10/2008 | Marius et al. | |
| 2008/0263505 A1 | 10/2008 | StClair et al. | |
| 2011/0119195 A1 * | 5/2011 | McLees et al. | 705/301 |

FOREIGN PATENT DOCUMENTS

| | | |
|---|---|---|
| EP | 2296094 A1 | 3/2011 |
| KR | 20050012460 A | 2/2005 |

OTHER PUBLICATIONS

Natt och Dag et al. "A Feasibility Study of Automated Natural Language Requirements Analysis in Market-Driven Development." 2002. Requirements Engineering. 7(1). pp. 20-33.*
Microsoft. Microsoft Visual Studio Developer Center. "Requirements Management Solutions." Copyright 2011. Date printed May 6, 2011 <http://msdn.microsoft.com/en-us/vstudio/dd632936>.
Wiegers et al. Serena Software, Inc. "Requirements Management. The Proven Way to Accelerate Development." pp. 1-13. Copyright 2005.
Sparx Systems. "Requirements Management with Enterprise Architect." Version 1.3, pp. 1-50. Copyright 2010.

(Continued)

*Primary Examiner* — James E Richardson
(74) *Attorney, Agent, or Firm* — Nicholas L. Cadmus; Jason H. Sosa (57) ABSTRACT

A requirements management tool, where each requirement is defined by one or more design element values. Each of the design element values is a unique value and is a member of a group of design element values defined for the project. As each requirement is created, the design element values for the requirement are selected from the group of design element values, or alternatively, a new design element value may be entered by a user, and the new design element value will be added to the group of element values. Each design element value corresponds to a category that each of the requirements are broken down into. Design element values in the created requirement are compared to design element values in existing requirements, and results of this duplication check are presented to a user of the requirements management tool.

21 Claims, 7 Drawing Sheets

(56) References Cited

OTHER PUBLICATIONS

Cant et al. "Tools for Requirements Management: a Comparison of Telelogic Doors and the HiVe." Australian Government, Department of Defence. Published by Defence Science and Technology Organisation, Edinburgh, South Australia. Jul. 2006.

Duplicatecontent.Net. Duplicate Content Tool. Copyright 2007. Date printed May 5, 2011 <http://www.duplicatecontent.net/>.

MK. Bright Hub, Inc.. "Estimating the Development Effort for your Software Project." Copyright 2011. Published on Jan. 15, 2009; last updated on Jan. 18, 2009 <http://www.brighthub.com/office/project-management/articles/22542.aspx>.

IBM. "Rational Doors—Features and benefits—Requirements management." Date printed May 5, 2011 <http://www-01.ibm.com/software/awdtools/doors/features/requirements.html>.

Seomastering.com. "Duplicate Content Checker—Similar Text Finder." Barnaul, Russia. Date printed May 5, 2011. <http://www.seomastering.com/similar-text-checker.php>.

* cited by examiner

STRUCTURED REQUIREMENTS MANAGEMENT

FIELD OF THE INVENTION

The present invention relates generally to requirements management, and more specifically to structuring requirements management for duplicity checking and detailed requirements analysis.

BACKGROUND OF THE INVENTION

Requirements management is the process of documenting, analyzing, tracing, prioritizing and agreeing on requirements and then controlling change and communicating to relevant stake holders. It is a continuous process throughout a project. A requirement is a capability to which a project outcome (product or service) should conform.

Requirements governing the development of various types of projects have grown as the complexity of these projects has increased. Any heterogeneous system (e.g., one built from different types of components) can be defined by a set of requirements documents with which the developed product must comply. Such systems exist in many types of manufacturing and product development, such as automotive, military, aerospace, and complex medical systems. Exemplary products may contain such components as computer software programs, computer hardware, semiconductors, mechanical and electrical products, etc. Requirements are often formulated in documents and are partitioned into pieces of text called individual requirements. The requirements are often represented hierarchically.

In requirements management, the refinement and facilitation of requirements are considered in conjunction with the development of a design. The process of requirements specification is an iterative process in which increasingly detailed requirements are produced by the refinement of previously defined requirements. The development of a design generally begins from a set of initial requirements. As the design process progresses, the initial requirements are extended with intermediate design decisions, usually called "derived" requirements. These requirements are added to the whole set of requirements. During the design procedure, further requirements may be elucidated. Managing changes and/or additions to the initial or derived requirements or design often lead to inconsistencies in the requirement and/or design.

Requirements management tools exist, some of which are integrated with design management tools. Two exemplary products are RequisitePro® (available from IBM® Rational® at http://www.ibm.com) and Rational® DOORS® (also available from IBM).

Requirements are managed in text format, and may be linked to one another and/or the design (i.e., traceability). Because the requirements are captured in text, only limited analysis can be done for details within a requirement, and comparing requirements for duplication becomes difficult.

SUMMARY

Aspects of the present invention disclose a method, computer system, and computer program product for managing requirements of a project. A computer receives a first plurality of entries for a first requirement, where each of the first plurality of entries is a member of a predefined list of valid entries for the requirements of the project. The computer receives a second plurality of entries for a second requirement, where each of the second plurality of entries is a member of the predefined list of valid entries. The computer determines that one or more entries of the first plurality are contained in the second plurality. Based on the amount of entries in the first plurality that are contained in the second plurality, the computer determines a rank indicative of a likelihood that the second requirement is a duplicate of the first requirement.

DETAILED DESCRIPTION

In the following detailed description, numerous specific details are set forth in order to provide a thorough understanding of the invention. However, it will be understood by those of ordinary skill in the art that the present invention may be practiced without these specific details. In other instances, well-known methods, procedures, and components have not been described in detail so as not to obscure the present invention.

Unless specifically stated otherwise, as apparent from the following discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission, or display devices.

An embodiment of the present invention includes a requirement structure where each requirement is composed of one or more universal element values. The element values are "universal" insofar as any of the values may be used in any of the requirements for a given project. In the preferred embodiment, requirements are broken down into a number of predefined categories. Each of the predefined categories should correspond to some logical division of the requirement. For example, the predefined categories could be the divisions of a requirement into an "actor" category, an "input" category, a "process" category, a "characteristics" category, and an "output" category. In other embodiments, different, additional, or less divisions may be made. Each of the universal element values belongs to at least one of the predefined categories. Values from the group of universal element values are the only values that may define a given requirement. Each of the categories may be referred to as a design element of the requirement or a design element master (DEM). The universal element values making up a requirement and belonging to a predefined category or DEM, may be hereafter referred to as "design element values," as each is a potential value of a DEM.

In the preferred embodiment, when creating a requirement, a user may select the DEM the user wants to describe in the requirement, and subsequently select a design element value associated with that DEM. For example an "actor" category may logically refer to the major stake holder involved in or driving the requirement. The design element values describing potential actors for requirements of the project may include a "car," an "operator," a "software tool," etc. A user could select the "actor" DEM and in response, have the ability to select the design element value "car." The design element value "car" may be saved as a design element value for the requirement. Other DEMs and respective design element values may be chosen for the requirement.

Figure 1:
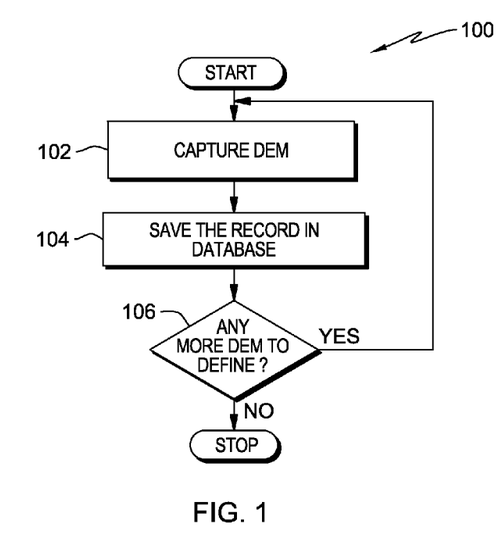
FIG. 1 depicts a flowchart for the steps of DEM program 100 for determining DEM in accordance with an embodiment of the present invention.

FIG. 1 depicts a flowchart for the steps of DEM program 100 for predefining the DEMs in accordance with an embodiment of the present invention.

DEM program 100 captures a DEM (step 102). In a preferred embodiment, DEM program 100 achieves this by receiving the DEM in a user interface that allows the user to enter in the desired DEM name.

DEM program 100 saves the DEM in a database for predefined DEM (step 104).

DEM program 100 determines if there are any more DEM to define (decision block 106). If there are more DEM to define, DEM program 100 returns to step 102 to capture another DEM name. If DEM program 100 has captured and saved all the DEMs, DEM program 100 ends.

In one embodiment, the execution of DEM program 100 may be commenced by a user at any time to update the predefined DEM. In another embodiment, the DEM may be updated by DEM program 100 at the beginning of a new project. The DEMs may come with default names. In some embodiments, access to DEM program 100 may be restricted to a certain class of user (such as the owner of the project, administrators, etc.). In yet another embodiment, the present invention may be devoid of the functionality of DEM program 100 and DEMs may be predefined by a manufacturer.

Figure 2:
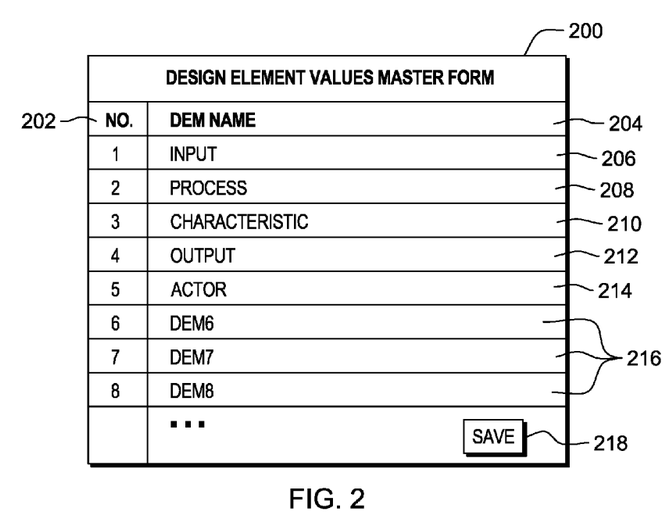
FIG. 2 illustrates an exemplary user interface for capturing and receiving the DEM.

FIG. 2 illustrates an exemplary user interface for capturing and receiving the DEMs. Design elements master form 200 is the user interface for receiving user defined DEMs. Column 202 represents the number of the DEM. Column 204 represents the received, user defined DEM names.

In the depicted example, received DEMs include input 206, process 208, characteristics 210, output 212, actor 214, and exemplary additional DEM names 216. In other embodiments, the DEMs may differ in name and/or purpose, and the amount may vary. The names are merely symbolic, and any categories may be chosen. DEMs 206, 208, 210, 212, and 214 are representative of a logical division.

For example:

Input 206 is a DEM that may include one or more design element values that may trigger the need for a requirement to be met. Process 208 may include one or more design element values that describe a process or function of a requirement. Characteristic 210 may include one or more design element values that describe one or more expected characteristics and/or side effects of a process of a requirement (described by a design element value of process 208). Output 212 may include one or more design element values describing a key benefit or result of a process. In some instances, this may be the same as a design element value for characteristics 210. Actor 214 is similar to the DEM example given earlier and may include one or more design element values describing a major stake holder involved in or driving a requirement.

Button 218, when selected by a user, signals a program, such as DEM program 100, to save the entered DEM name(s) to a DEM database.

Figure 3:
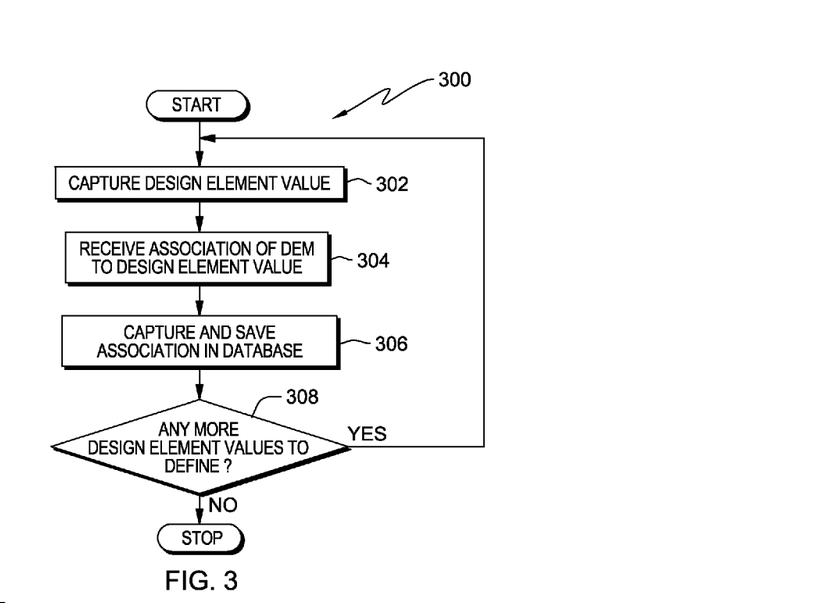
FIG. 3 depicts the steps of a flowchart for define design element values program 300 in accordance with an embodiment of the present invention.

FIG. 3 depicts the steps of a flowchart for define design element values program 300 in accordance with an embodiment of the present invention. Define design element values program 300 defines (or more accurately allows a user to define) the potential design element values for an entire project. In a preferred embodiment, every requirement created for the project will be composed of these predefined design element values, with each of the defined element values associated with a DEM. In another embodiment, a design element value may be defined (and added to the group of universal element values) during the creation of a requirement.

Define design element values program 300 captures a design element value (step 302). The design element value is the combination of characters or numbers used to distinguish one potential value from another. For example if a design element value for a requirement is "car" (e.g. for an "actor" DEM), the value entered may be the characters 'c' 'a' 'r'. Any value may be entered so long as it is unique. The preferred embodiment uses characters and words descriptive of the design element so that quick associations may be made.

Define design element values program 300 receives an indication of association with a DEM for the design element value (step 304). The indication may be received through a user interface where a user selects the DEM for each entered design element value.

Define design element values program 300 captures and saves the association in a database for the defined design element values (step 306).

Define design element values program 300 determines whether there are more design element values to define (decision block 308), and in response to determining that there are more design element values to define, returns to step 302 to capture the design element value. If define design element values program 300 determines that there are no more design element values to define, program 300 ends.

Figure 4:
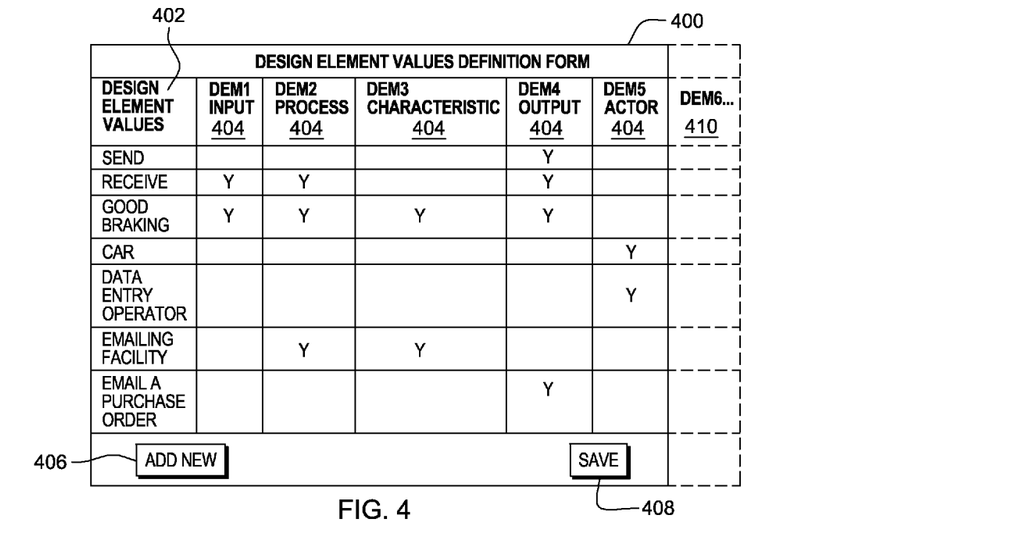
FIG. 4 illustrates an exemplary user interface for defining design element values as contemplated by define design element values program 300.

FIG. 4 illustrates an exemplary user interface for defining design element values as contemplated by define design element values program 300.

Design element values definition form 400 is the user interface for receiving, capturing, and saving the design element values for a project. In a preferred embodiment, new design element values are defined for every new project.

In column 402, a user may enter design element values. In the depicted example, the design element values include "send," "receive," "good braking," "car," "data entry operator," "emailing facility," and "email a Purchase Order."

Columns 404 are the DEMs that each design element value may be associated with. In the depicted example, a 'Y' may be entered to indicate if the design element value is to be associated with a specific DEM. In another embodiment, the DEM, for each entered design element value, may be selected from drop down list. Other methods for associating the design element value with the DEM may be used.

Button 406 allows a user to create a new row where a new design element value and respective DEM association may be entered.

Button 408 triggers a program, such as program 300, to capture and save the design element values, for example in a design element database.

Column 410 represents that additional DEM columns may be present when additional DEMs have been predefined.

Figure 5A:
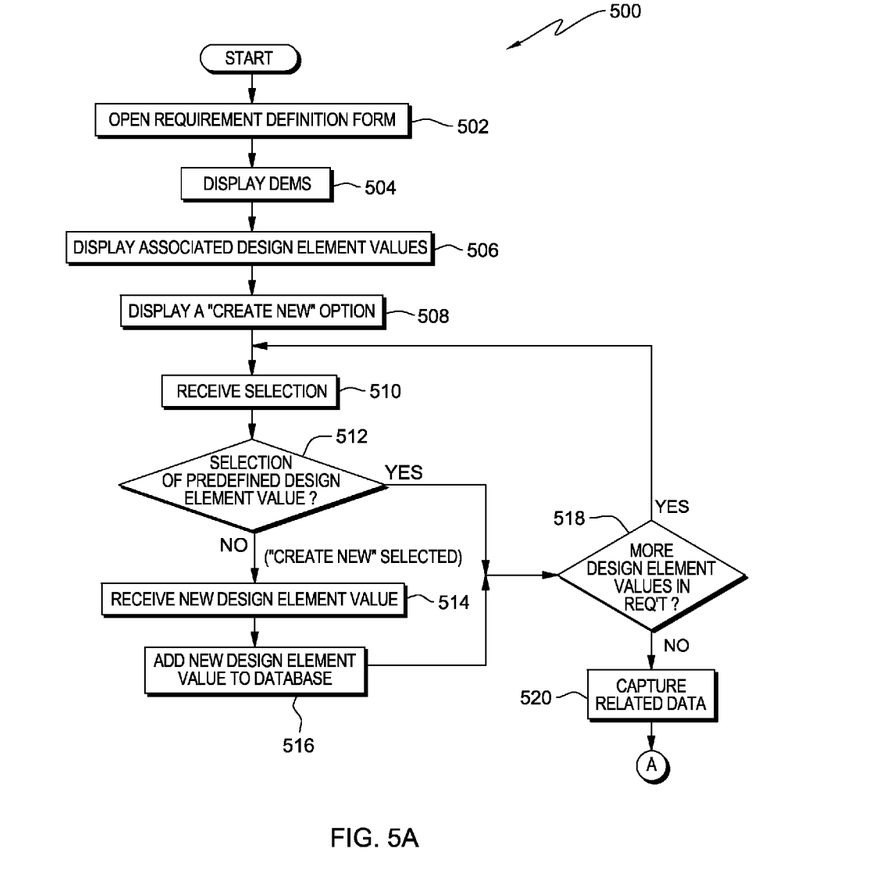
FIGS. 5A and 5B depict the steps of a flowchart for create requirement program 500 in accordance with an embodiment of the present invention.
Figure 5B:
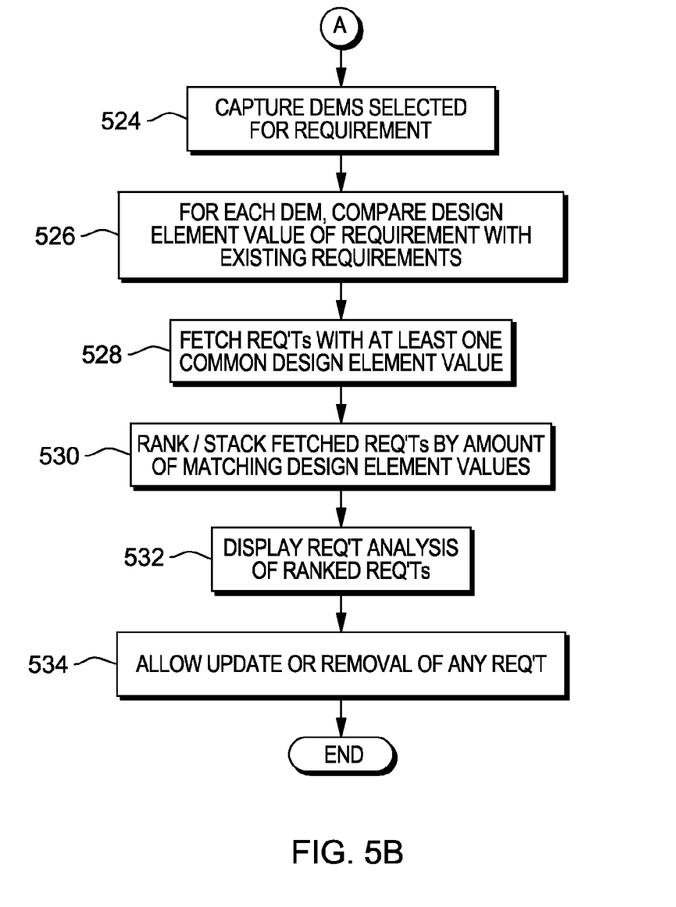

FIGS. 5A and 5B depict the steps of a flowchart for create requirement program 500 in accordance with an embodiment of the present invention.

Create requirement program 500 opens a requirement definition form (step 502). The requirement definition form is a user interface for creating a requirement. Create requirement program 500 displays the potential DEMs (step 504) that may go into a requirement (e.g., actor, input, process, output, etc.).

In an embodiment, create requirement program 500 displays the associated design element values (step 506) for each of the DEMs. In a preferred embodiment, the design element values associated with each DEM are displayed in response to the selection of a drop down list corresponding to the displayed DEM.

Along with the associated design element values, create requirement program 500 displays a "create new" option (step 508), preferably at the bottom of each drop down list of design element values.

Create requirement program 500 receives a selection (step 510) from the user. The selection may be either a design element value or the "create new" option. In the preferred embodiment, a user may select a drop down list corresponding to a DEM and from that list select a design element value or the "create new" option. The selection is received by create requirement program 500.

Create requirement program 500 determines if the selection was a design element value (decision block 512). If the selection was not a design element value (i.e., "create new" was selected), create requirement program 500 receives a new design element value (step 514). The user interface allows entry of the new design element value from a user. In a preferred embodiment, the new design element value is automatically associated with the DEM corresponding to the drop list from which the "create new" option was selected. In another embodiment, the user may enter which DEM the new design element value is associated with.

Create requirement program 500 adds the new design element value to the design element database (step 516). In a subsequent execution of create requirement program 500, the new design element value will appear as a predefined value in the drop down list.

After adding the new design element value (step 516), or alternatively, after determining that the received selection was a predefined design element value (decision block 512), create requirement program 500 determines if there are more design elements values for the requirement (decision block 518). This may be determined by the selection of another element in a drop down list. If there is another design element value for the requirement, create requirement program returns to step 510 to receive the selection.

If create requirement program 500 determines that there are no more design element values for the requirement, create requirement program captures any other related data (step 520). In a field of a user interface, the user may enter related data (e.g., a description of the requirement), step 520 receives the data entered into this field.

With the requirement complete, the requirement can be checked against other requirements of the project for duplication.

Create requirement program 500, in one embodiment, captures the DEMs selected for the created requirement (step 524), as not every DEM must be represented by a design element value. In another embodiment, create requirement program 500 may be devoid of this step, and all DEMs are treated equally.

Create requirement program 500 compares the selected design element values for each DEM of the created requirement with the design element values for each respective DEM of every previously created requirement of the project (step 526). As every design element value of a requirement is selected from the predefined database of elements (or created new and added to the database), the same design element is not represented differently in various requirements. If the values of the design elements are the same, the design elements match, and any ambiguity caused by syntax and textual variances are avoided.

Create requirement program 500 locates every requirement that has at least one design element value in common with the created requirement (step 528). In a preferred embodiment, only design element values belonging to the same DEM are compared.

Create requirement program 500 ranks the located requirements by the amount of matching design element values (step 530) they have when compared to the created requirement. In a preferred embodiment, the located requirements are displayed in a stacked fashion, where the closest matching requirements are viewable one on top of another. In another embodiment, only requirements meeting a certain threshold of similarity are ranked and displayed. The threshold may be a single matching value, or a percentage of matching values. In one embodiment, a user may define the threshold.

Create requirement program 500 displays an analysis of each ranked requirement (step 532). This display may be referred to as the Requirement Analysis Form. For each requirement, each DEM, and the DEM's respective design element value, displays. Some indication of which of the design element values match the created requirement also displays.

In a preferred embodiment, for each requirement (located requirements and the created requirement), create requirement program 500 can receive a selection to update the requirement or to remove the requirement (step 534). In another embodiment, if in the analysis, create requirement program 500 determines that the new requirement matches an existing requirement at a certain threshold level of unacceptable likelihood of the requirement being a duplicate (e.g., 60%, 80%, a user defined percentage, etc.), create requirement program 500 requires that an update or removal take place to at least one of requirements.

In another embodiment, if the threshold level of unacceptable likelihood is met, or alternatively in response to a user selection in response to a displayed analysis, the new requirement and the existing requirement may be merged by create requirement program 500 to create a single requirement in place of the two requirements. This has the advantage of automatically including a single instance of each unique design element value to create the most accurate requirement for the project—though a requirement description may be lost.

In another embodiment, if it appears that separate design element values may be indicative of the same thing (i.e., "car" or "jeep" values for an "actor" DEM), duplicates may be searched by selecting both values for the requirement and create requirement program 500 will return a match for the "actor" value where the value matches either of the selected values.

Figure 6:
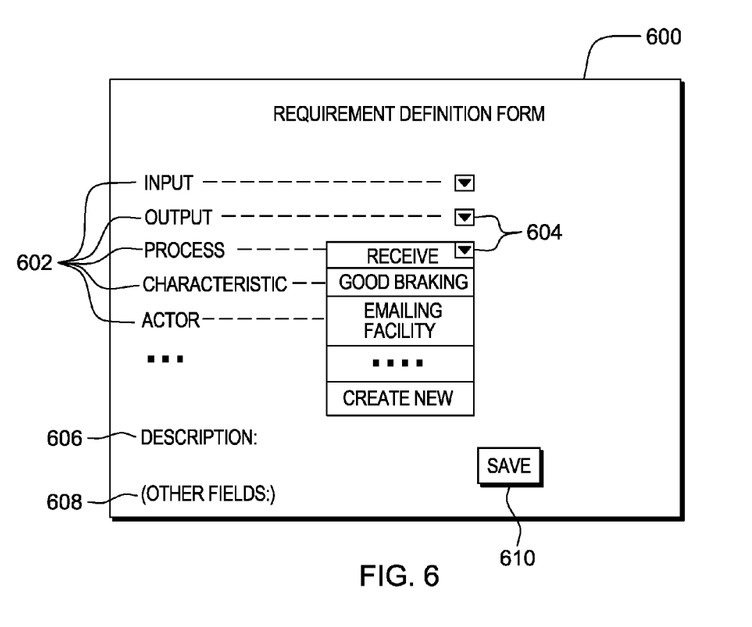
FIG. 6 illustrates an exemplary user interface for creating a new requirement as contemplated by create requirement program 500.

FIG. 6 illustrates an exemplary user interface for creating a new requirement as contemplated by create requirement program 500.

Requirement definition form 600 is the user interface for receiving the design element values for a requirement. The potential DEMs 602 applicable to each requirement of a project are displayed on requirement definition form 600. Drop down menus 604 correspond to each DEM name of potential DEMs 602. In this depiction, one of the drop down menus 604 has been selected, and requirement definition form 600 is displaying the predefined design element values for the "process" DEM 602. A user may select any of the predefined design element values or the "create new" option at the bottom of drop down menu 604.

Description field 606 may be filled by a user to explain the requirement more thoroughly. This is an optional part of the requirement structure, and in a preferred embodiment, is not used when comparing multiple requirements. Description field 606 is not a design element value of the requirement. Other fields 608 may be included in various embodiments. Button 610 signals the completion of the requirement, and triggers an analysis of the created requirement against existing requirements. If there are no matching values, the created requirement is saved; otherwise, user input may be required to determine how to proceed.

Figure 7:
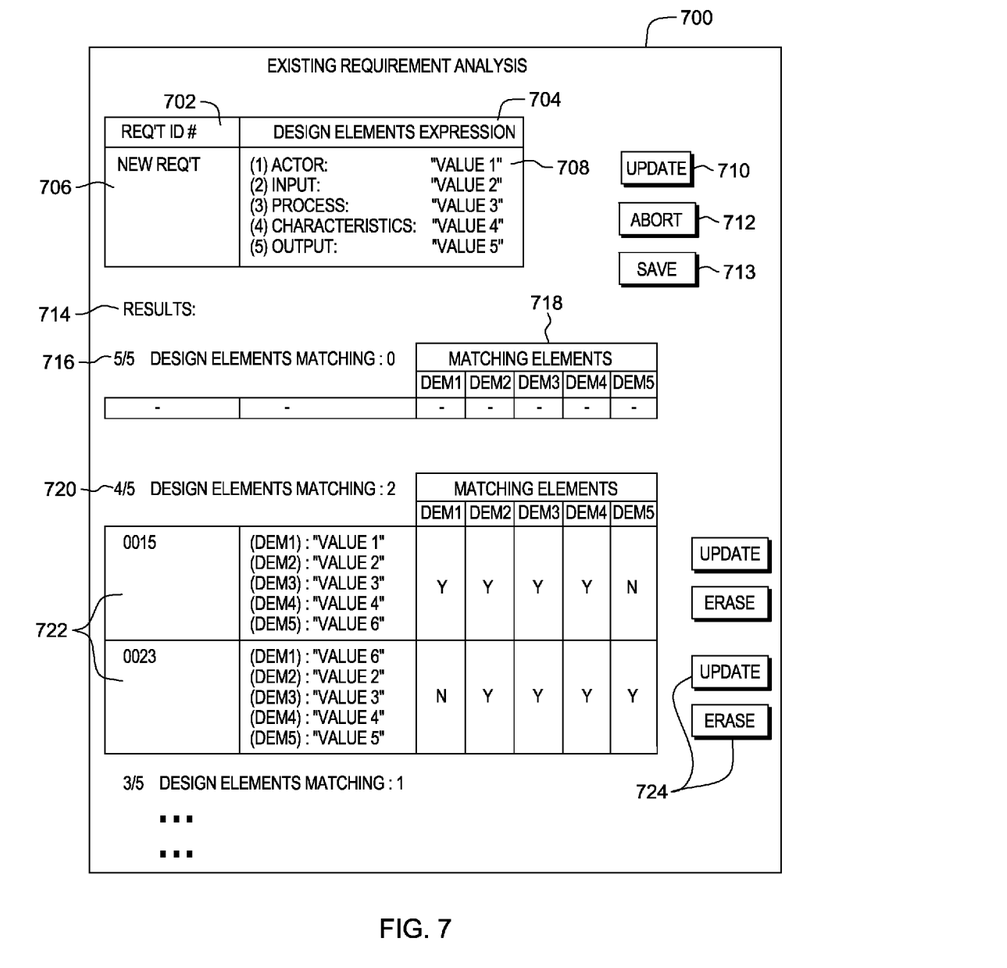
FIG. 7 depicts an exemplary user interface for displaying a requirements analysis and allowing a user to update or remove the requirements as contemplated by create requirement program 500.

FIG. 7 depicts an exemplary user interface for displaying a requirements analysis and allowing a user to update or remove the requirements as contemplated by create requirement program 500.

Existing requirement analysis 700 is the user interface for displaying the requirement analysis. Identification column 702 lists a requirement identification number or tag for every requirement displayed. Design element expression column 704 displays the DEMs and the corresponding design element values for each respective requirement.

In the depicted embodiment, the newly created requirement is shown at the top. Identification 706 identifies the newly created requirement as "New Req't." Other identifiers may be used in different embodiments.

Expression 708, corresponds to the new requirement and contains DEM names like Actor, Input, Process, Characteristics, and Output, have design element values "value 1" through "value 5," respectively. These values are exemplary and may be any of the design element values entered in design element values definition form 400, for example, or any design element value entered subsequent to a "create new" selection in a requirement definition form such as requirement definition form 600.

Update button 710 allows for a user to return to a requirement definition form to change, remove, or add design element values. Abort button 712 causes the erasure of the newly created requirement. Save button 713 allows a user to choose to save the requirement even though there are matching values in existing requirements.

Results tab 714 indicates that the subsequent display shows the results of a requirements duplication check.

Subsection 716 displays the requirements, with their respective identification numbers and corresponding design element expressions, having five matching design element values. Matching element columns 718 provide an easy indication of which of the values in the DEMs match. In the depicted example, an empty row is displayed if no requirement matches any of the design element values. In another embodiment, existing requirement analysis 700 may be devoid of subsection 716 when there are no requirements to be displayed.

Subsection 720 displays the requirements having four out of five matching design elements. Here, requirements 722, as identified by identification numbers 0015 and 0023, are shown with their respective design element expressions and indications of which design elements match. Each of the respective requirements 722, have corresponding buttons 724 to signal an update or an erasure for the respective requirement.

Existing requirement analysis 700 may include consecutive decreasing subsections for displaying requirements with a decreasing number of matching DEMs.

Figure 8:
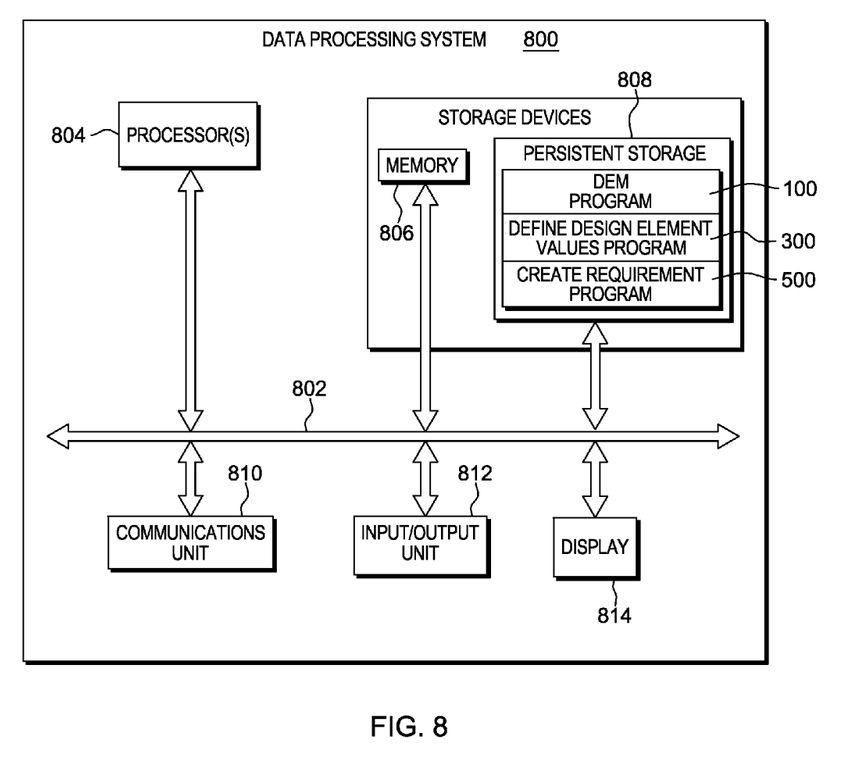
FIG. 8 illustrates a block diagram of components of a data processing system depicted in accordance with an illustrative embodiment.

FIG. 8 illustrates a block diagram of components of a data processing system depicted in accordance with an illustrative embodiment. It should be appreciated that FIG. 8 provides only an illustration of one implementation and does not imply any limitations with regard to the environments in which different embodiments may be implemented. Many modifications to the depicted environment may be made.

Data processing system 800 is representative of any electronic device capable of executing machine-readable program instructions. In a preferred embodiment, data processing system is a single computer. Other embodiments include a PDA, laptop, smart phone, or a grouping of multiple computers such as in a data center.

Data processing system 800 includes communications fabric 802, which provides communications between processor(s) 804, memory 806, persistent storage 808, communications unit 810, input/output (I/O) unit 812, and display 814.

Memory 806 and persistent storage 808 are examples of computer-readable tangible storage devices. A storage device is any piece of hardware that is capable of storing information, such as data, program code in functional form, and/or other suitable information on a temporary basis and/or permanent basis. Memory 806 may be, for example, one or more random access memories (RAM) or any other suitable volatile or non-volatile storage device.

DEM program 100, define design element values program 300, and create requirement program 500 are stored in persistent memory 808 for execution by one or more of the respective processors 804 via one or more storage devices of memory 806 (which typically includes cache memory). In the embodiment illustrated in FIG. 8, persistent memory 808 includes flash memory. Alternatively, or in addition to, persistent memory 808 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 808 may also be removable. For example, a removable hard drive may be used for persistent storage 808. Other examples include an optical or magnetic disk that is inserted into a drive for transfer onto another storage device that is also a part of persistent storage 808, or other removable storage devices such as a thumb drive or smart card.

Communications unit 810, in these examples, provides for communications with other data processing systems or devices. Communications unit 810 may be a network interface card. Communications unit 810 may provide communications through the use of either or both physical and wireless communications links. In another embodiment still, data processing system 800 may be devoid of communications unit 810.

Input/output unit 812 allows for input and output of data with other devices that may be connected to data processing system 800. For example, input/output unit 812 may provide a connection for user input through a keyboard, keypad, a microphone, and/or some other suitable input device.

Display 814 provides a mechanism to display information to a user.

DEM program 100, define design element values program 300, and create requirement program 500 can be written in various programming languages (such as Java or C++) including low-level, high-level, object-oriented or non object-oriented languages. Alternatively, the functions of DEM program 100, define design element values program 300, and create requirement program 500 can be implemented in whole or in part by computer circuits and other hardware (not shown).

Based on the foregoing, a computer system, method, and program product have been disclosed for structuring and managing requirements. However, numerous modifications and substitutions can be made without deviating from the scope of the present invention. In this regard, each block in the flowcharts or block diagrams may represent a module, segment, or portion of code, which comprises one or more executable instructions for implementing the specified logical functions(s). It should also be noted that, in some alternative implementations, the functions noted in the flowcharts and block diagrams may occur out of the order noted in the figures. Therefore, the present invention has been disclosed by way of example and not limitation.

What is claimed is:

1. A method for managing requirements of a project, the method comprising the steps of:
   a computer receiving a first plurality of entries for a first requirement, where each of the first plurality of entries is a member of a predefined list of valid entries for the requirements of the project;
   the computer receiving a second plurality of entries for a second requirement, where each of the second plurality of entries is a member of the predefined list of valid entries;
   the computer receiving a list of predefined categories, wherein the list of predefined categories represents potential divisions within each of the requirements of the project, and wherein each entry of the first and second plurality of entries is associated with at least one category from the list of predefined categories;
   the computer determining that an entry of the first plurality of entries matches an entry of the second plurality of entries, wherein the entry of the first plurality entries is associated with a first plurality of categories and the entry of the second plurality of entries is associated with a second plurality of categories;
   the computer determining that there is a category from the first plurality of categories that matches a category from the second plurality of categories;
   based on at least the entry of the first plurality of entries that matches the entry of the second plurality of entries and on the category from the first plurality of categories that matches the category from the second plurality of categories, the computer determining a rank indicative of a likelihood that the second requirement is a duplicate of the first requirement;
   the computer causing an analysis to be displayed in a user interface, the analysis indicating similarities between the first requirement and the second requirement, wherein the analysis comprises at least a listing of the entry of the first plurality of entries that matches the entry of the second plurality of entries;
   the computer receiving an indication of a user selection of an action to be performed in response to the displayed analysis; and
   the computer performing the action.

2. The method of claim 1, wherein the step of the computer receiving the first plurality of entries for the first requirement, comprises at least one of the steps of:
   the computer receiving an entry for the first requirement from the predefined list of valid entries; and
   the computer receiving an entry for the first requirement not in the predefined list of valid entries and adding the entry for the first requirement not in the predefined list to the predefined list.

3. The method of claim 1, wherein the action is selected from the group consisting of: merging the first and second requirement to form one single requirement in place of the first and second requirement, erasing the first requirement, erasing the second requirement, adding one or more entries to the first plurality of entries, removing one or more entries from the first plurality of entries, adding one or more entries to the second plurality of entries, and removing one or more entries from the second plurality of entries.

4. The method of claim 1, wherein the analysis further comprises a listing of the first plurality of entries for the first requirement and the second plurality of entries for the second requirement.

5. The method of claim 1, wherein the analysis further comprises a category for each of the first plurality of entries for the first requirement and each of the second plurality of entries for the second requirement.

6. The method of claim 1, wherein the analysis further comprises the rank indicative of a likelihood that the second requirement is a duplicate of the first requirement.

7. The method of claim 1, further comprising the steps of:
   the computer receiving a third plurality of entries for a third requirement, where each of the third plurality of entries is a member of a predefined list of valid entries for the requirements of the project;
   the computer determining that one or more entries of the first plurality of entries are contained in the third plurality of entries; and
   based on an amount of entries in the first plurality of entries which are contained in the third plurality of entries, the computer determining a rank indicative of a likelihood that the third requirement is a duplicate of the first requirement;
   wherein the analysis further comprises a listing of the second requirement and the third requirement in an order indicative of the determined ranks.

8. A computer program product for managing requirements of a project, the computer program product comprising:
   one or more computer-readable tangible storage devices and program instructions stored on at least one of the one or more storage devices, the program instructions comprising:
   program instructions to receive a first plurality of entries for a first requirement, where each of the first plurality of entries is a member of a predefined list of valid entries for the requirements of the project;
   program instructions to receive a second plurality of entries for a second requirement, where each of the second plurality of entries is a member of the predefined list of valid entries;
   program instructions to receive a list of predefined categories, wherein the list of predefined categories represents potential divisions within each of the requirements of the project, and wherein each entry of the first and second plurality of entries is associated with at least one category from the list of predefined categories;

program instructions to determine that an entry of the first plurality of entries matches an entry of the second plurality of entries, wherein the entry of the first plurality entries is associated with a first plurality of categories and the entry of the second plurality of entries is associated with a second plurality of categories;

program instructions to determine that there is a category from the first plurality of categories that matches a category from the second plurality of categories;

program instructions to, based on at least the entry of the first plurality of entries that matches the entry of the second plurality of entries and on the category from the first plurality of categories that matches the category from the second plurality of categories, determine a rank indicative of a likelihood that the second requirement is a duplicate of the first requirement;

program instructions to cause an analysis to be displayed in a user interface, the analysis indicating similarities between the first requirement and the second requirement, wherein the analysis comprises at least a listing of the entry of the first plurality of entries that matches the entry of the second plurality of entries;

program instructions to receive an indication of a user selection of an action to be performed in response to the displayed analysis; and program instructions to perform the action.

9. The computer program product of claim 8, wherein the program instructions to receive the first plurality of entries for the first requirement, comprises program instructions to:
receive an entry for the first requirement from the predefined list of valid entries; and
receive an entry for the first requirement not in the predefined list of valid entries and add the entry for the first requirement not in the predefined list to the predefined list.

10. The computer program product of claim 8, wherein the action is selected from the group consisting of: merging the first and second requirement to form one single requirement in place of the first and second requirement, erasing the first requirement, erasing the second requirement, adding one or more entries to the first plurality of entries, removing one or more entries from the first plurality of entries, adding one or more entries to the second plurality of entries, and removing one or more entries from the second plurality of entries.

11. The computer program product of claim 8, wherein the analysis further comprises a listing of the first plurality of entries for the first requirement and the second plurality of entries for the second requirement.

12. The computer program product of claim 8, wherein the analysis further comprises a category for each of the first plurality of entries for the first requirement and each of the second plurality of entries for the second requirement.

13. The computer program product of claim 8, wherein the analysis further comprises the rank indicative of a likelihood that the second requirement is a duplicate of the first requirement.

14. The computer program product of claim 8, further comprising:
program instructions, stored on at least one of the one or more storage devices, to receive a third plurality of entries for a third requirement, where each of the third plurality of entries is a member of a predefined list of valid entries for the requirements of the project;

program instructions, stored on at least one of the one or more storage devices, to determine that one or more entries of the first plurality of entries are contained in the third plurality of entries; and based on an amount of entries in the first plurality of entries which are contained in the third plurality of entries, program instructions, stored on at least one of the one or more storage devices, to determine a rank indicative of a likelihood that the third requirement is a duplicate of the first requirement;

wherein the analysis further comprises a listing of the second requirement and the third requirement in an order indicative of the determined ranks.

15. A computer system for managing requirements of a project, the computer system comprising:
one or more processors, one or more computer-readable memories, one or more computer-readable tangible storage devices and program instructions which are stored on the one or more storage devices for execution by the one or more processors via the one or more memories, the program instructions comprising:

program instructions to receive a first plurality of entries for a first requirement, where each of the first plurality of entries is a member of a predefined list of valid entries for the requirements of the project;

program instructions to receive a second plurality of entries for a second requirement, where each of the second plurality of entries is a member of the predefined list of valid entries;

program instructions to receive a list of predefined categories, wherein the list of predefined categories represents potential divisions within each of the requirements of the project, and wherein each entry of the first and second plurality of entries is associated with at least one category from the list of predefined categories;

program instructions to determine that an entry of the first plurality of entries matches an entry of the second plurality of entries, wherein the entry of the first plurality entries is associated with a first plurality of categories and the entry of the second plurality of entries is associated with a second plurality of categories;

program instructions to determine that there is a category from the first plurality of categories that matches a category from the second plurality of categories;

program instructions to, based on at least the entry of the first plurality of entries that matches the entry of the second plurality of entries and on the category from the first plurality of categories that matches the category from the second plurality of categories, determine a rank indicative of a likelihood that the second requirement is a duplicate of the first requirement;

program instructions to cause an analysis to be displayed in a user interface, the analysis indicating similarities between the first requirement and the second requirement, wherein the analysis comprises at least a listing of the entry of the first plurality of entries that matches the entry of the second plurality of entries;

program instructions to receive an indication of a user selection of an action to be performed in response to the displayed analysis; and program instructions to perform the action.

16. The computer system of claim 15, wherein the program instructions to receive the first plurality of entries for the first requirement, comprises program instructions to:
receive an entry for the first requirement from the predefined list of valid entries; and receive an entry for the first requirement not in the predefined list of valid entries and add the entry for the first requirement not in the predefined list to the predefined list.

17. The computer system of claim 15, wherein the action is selected from the group consisting of: merging the first and second requirement to form one single requirement in place of the first and second requirement, erasing the first requirement, erasing the second requirement, adding one or more entries to the first plurality of entries, removing one or more entries from the first plurality of entries, adding one or more entries to the second plurality of entries, and removing one or more entries from the second plurality of entries.

18. The computer system of claim 15, wherein the analysis further comprises a listing of the first plurality of entries for the first requirement and the second plurality of entries for the second requirement.

19. The computer system of claim 15, wherein the analysis further comprises a category for each of the first plurality of entries for the first requirement and each of the second plurality of entries for the second requirement.

20. The computer system of claim 15, wherein the analysis further comprises the rank indicative of a likelihood that the second requirement is a duplicate of the first requirement.

21. The computer system of claim 15, further comprising:
program instructions, stored on at least one of the one or more storage devices, to receive a third plurality of entries for a third requirement, where each of the third plurality of entries is a member of a predefined list of valid entries for the requirements of the project;
program instructions, stored on at least one of the one or more storage devices, to determine that one or more entries of the first plurality of entries are contained in the third plurality of entries; and
based on an amount of entries in the first plurality of entries which are contained in the third plurality of entries, program instructions, stored on at least one of the one or more storage devices, to determine a rank indicative of a likelihood that the third requirement is a duplicate of the first requirement;
wherein the analysis further comprises a listing of the second requirement and the third requirement in an order indicative of the determined ranks.

* * * * *